United States Patent [19]
Kunimi et al.

[11] Patent Number: 5,596,083
[45] Date of Patent: Jan. 21, 1997

[54] MONOAZO COMPOUNDS AND METHOD FOR DYEING OR PRINTING FIBER MATERIALS USING THE SAME

[75] Inventors: Nobutaka Kunimi, Toyonaka; Yasuyoshi Ueda, Hirakata; Takashi Omura, Kobe, all of Japan

[73] Assignee: Sumitomo Chemical Company, Limited, Osaka, Japan

[21] Appl. No.: 579,603

[22] Filed: Dec. 26, 1995

[30]    Foreign Application Priority Data

Sep. 29, 1994  [JP]  Japan .................................. 7-253004
Dec. 26, 1994  [JP]  Japan .................................. 6-322835

[51] Int. Cl.$^6$ ............................. C09B 62/51; D06P 1/384
[52] U.S. Cl. .......................... 534/642; 534/635; 534/636; 8/549
[58] Field of Search ................... 534/642, 635, 534/636; 8/549

[56]            References Cited

U.S. PATENT DOCUMENTS

| | | | |
|---|---|---|---|
| 4,754,023 | 6/1988 | Tzikas et al. ................. | 534/642 X |
| 4,906,738 | 3/1990 | Kohlhaas et al. ............. | 534/636 |
| 5,235,046 | 8/1993 | Akahori et al. ............... | 534/642 X |
| 5,310,886 | 5/1994 | Springer et al. .............. | 534/642 X |

FOREIGN PATENT DOCUMENTS

| | | |
|---|---|---|
| 76782 | 4/1983 | European Pat. Off. ............... 534/642 |
| 0182366 | 5/1986 | European Pat. Off. . |
| 0241104 | 10/1987 | European Pat. Off. . |
| 0492128 | 7/1992 | European Pat. Off. . |
| 63-207861 | 8/1988 | Japan . |

OTHER PUBLICATIONS

Chemical Abstracts, vol. 110, No. 18, May 1, 1989, Columbus, Ohio, Abstract No. 156100h.

*Primary Examiner*—Fiona T. Powers
*Attorney, Agent, or Firm*—Watson Cole Stevens Davis P.L.L.C.

[57]    ABSTRACT

A monoazo compound suitable for dyeing or printing materials having a hydroxy group and/or amide group represented by the following general formula (I):

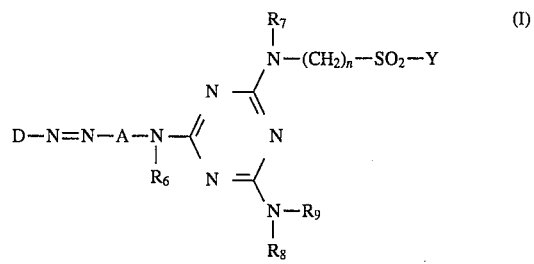

wherein D represents a phenyl or naphthyl group; A represents a group represented by the following formula:

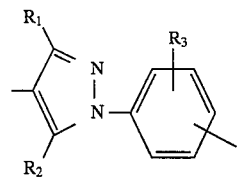

or A represents a group represented by the following formula:

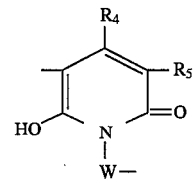

wherein $R_1$, $R_2$, $R_3$, $R_4$, $R_5$, $R_6$, $R_7$, $R_8$, $R_9$, n and Y have the meaning given in the specification; and salts thereof.

10 Claims, No Drawings

MONOAZO COMPOUNDS AND METHOD FOR DYEING OR PRINTING FIBER MATERIALS USING THE SAME

The present invention relates to improved monoazo compounds and salts thereof which are suitable for dyeing or printing materials having a hydroxy group and/or an amide group, particularly a cellulose fiber, a natural or synthetic polyamide fiber, a polyurethane fiber, a leather or the like or a mixed fiber thereof to give dyed products superior in light fastness, perspiration-light fastness and wet fastness.

various kinds of fiber reactive dyes have been known and widely used for dyeing and printing fiber materials such as cellulose fibers. For example, use of pyrazolone monoazo compounds having a vinylsulfon type reactive group in the molecule as reactive dyes are disclosed in JP-A-3-88861, etc.; and other monoazo dyes having two fiber-reactive groups connecting to carbon atoms of the triazine ring are also known. However, the known reactive dyes mentioned above are insufficient in dye performance such as build-up property, solubility and fastness properties, particularly insufficient in balance between the dye performance and the fastness; and are not satisfactory for meeting high demands of users in recent years to dye performance such as applicability to specific dyeing methods and to fastness. Hence, more improved dyes have been strongly demanded. Particularly, superior build-up property has become very important in recent years, because demand level in economy of dyeing methods has been getting higher and higher.

Inventors of the present invention have conducted extensive studies to solve the above-mentioned problems of known reactive dyes and to find improved reactive dyes capable to meet the high demands to the dyes in recent years, and, as the result, have found that specific monoazo compounds having a pyrazolone group or a pyridone group can attain the objects. Thus, the present invention was accomplished.

Thus, the present invention provides a monoazo compound represented by the following general formula (I):

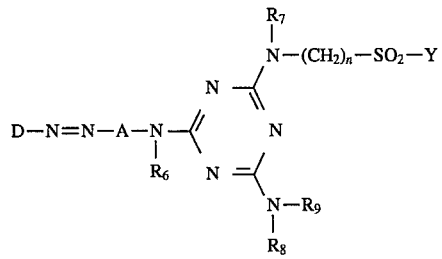

wherein D represents a phenyl or naphthyl group which may be optionally substituted; A represents a group represented by the following formula:

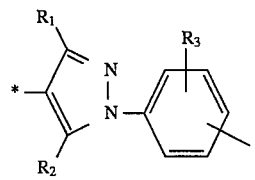

in which $R_1$ represents a methyl group, a carboxyl group or an alkoxycarbonyl group, $R_2$ represents a hydxoxyl group or an amino group, $R_3$ represents a hydrogen atom, a methyl group or a sulfo group, and * represents the portion connecting to the azo group;
or A represents a group represented by the following formula:

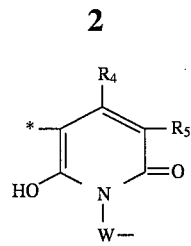

in which W represents an alkylene group, $R_4$ represents a lower alkyl group, $R_5$ represents a hydrogen atom, a halogen atom, a cyano group, a carbamoyl group, a sulfo group or a sulfoalkyl group and * represents the portion connecting to the azo group; $R_6$ and $R_7$ are the same or different and represent a hydrogen atom or a straight chain or branched chain alkyl group which may be optionally substituted; $R_8$ and $R_9$ are the same or different and represent a hydrogen atom, a straight chain or branched chain alkyl group which may be optionally substituted, a cycloalkyl group which may be optionally substituted, an allyl group, a phenyl group which may be optionally substituted or a naphthyl group which may be optionally substituted;
n is 2, 3 or 4;
Y represents —CH=CH$_2$ or —CH$_2$CH$_2$Z in which Z represents a group removable by the action of an alkali; provided that the substituents on D, $R_8$ or $R_9$ do not include a fiber reactive group, and at least one of the phenyl- or naphthyl groups represented by D, $R_8$ or $R_9$ is substituted by a sulfo group or a carboxyl group;
or a salt thereof.

The present invention also provides a method for dyeing or printing a fiber material using the compound of formula (I) or a salt thereof.

Preferable examples of the phenyl group represented by D in the formula (I) include a phenyl group substituted by 1, 2 or 3 substituents selected from a halogen atom, a methyl group, an ethyl group, a methoxy group, an ethoxy group, an acetylamino group, a propionylamino group, a nitro group, a sulfo group and a carboxyl group. Preferable examples of the naphthyl group represented by D in the formula (I) include a naphthyl group substituted by 1, 2 or 3 sulfo groups.

Examples of the alkoxycarbonyl group represented by $R_1$ include the one having 2–5 carbon atoms.

Though the alkylene group represented by W may be a straight chain or a branched chain group, preferably it is a straight chain having 6 or less carbon atoms and more preferably a straight chain having 2 or 3 carbon atoms.

Though the lower alkyl group represented by $R_4$ may be a straight chain or a branched chain group, preferably it is a straight chain having 4 or less carbon atoms and more preferably a methyl group.

Examples of the alkyl group represented by $R_5$ and $R_7$ include an unsubstituted alkyl group having 4 or less carbon atoms or an alkyl group having 4 or less carbon atoms substituted by at least one substituent selected from a group consisting of a hydroxyl group, a cyano group, an alkoxy group having 4 or less carbon atoms, a halogen atom, a carbamoyl group, a carboxyl group, an alkoxycarbonyl group having 5 or less carbon atoms,, an alkylcarbonyloxy group having 5 or less carbon atoms, a sulfo group and a sulfamoyl group.

Preferable examples of the alkyl group represented by $R_5$ and $R_7$ include a methyl group, an ethyl group, an n-propyl group, an isopropyl group, an n-butyl group, an isobutyl group, a sec-butyl group, a 2-hydroxyethyl group, a 2-hydroxypropyl group, a 3-hydroxypropyl group, a 2-hydroxybutyl group, a 3-hydroxybutyl group, a 4-hydroxybutyl group, a 2,3-dihydroxypropyl group, a 3,4-dihydroxybutyl group, a cyanomethyl group, a 2-cyanoethyl group, a 3-cyanopropyl group, a methoxymethyl group, an ethoxymethyl group, a 2-methoxyethyl-group, a 2-ethoxyethyl group, a 3-methoxypropyl group, a 3-ethoxypropyl group, a 2-hydroxy-3-methoxypropyl group, a chloromethyl group, a bromomethyl group, a 2-chloroethyl group, a 2-bromoethyl group, a 3-chloropropyl group, a 3-bromopropyl group, a 4-chlorobutyl group, a 4-bromobutyl group, a carboxymethyl group, a 2-carboxyethyl group, a 3-carboxypropyl group, a 4-carboxybutyl group, a 1,2-dicarboxyethyl group, a carbamoylmethyl group, a 2-carbamoylethyl group, a 3-carbamoylpropyl group, a 4-carbamoylbutyl group, a methoxycarbonylmethyl group, an ethoxycarbonylmethyl group, a 2-methoxycarbonylethyl group, a 2-ethoxycarbonylethyl group, a 3-methoxycarbonylpropyl group, a 3-ethoxycarbonylpropyl group, a 4-methoxycarbonylbutyl group, a 4-ethoxycarbonylbutyl group, a methylcarbonyloxymethyl group, an ethylcarbonyloxymethyl group, a 2-methylcarbonyloxyethyl group, a 2-ethylcarbonyloxyethyl group, a 3-methylcarbonyloxypropyl group, a 3-ethylcarbonyloxypropyl group, a 4-methylcarbonyloxybutyl group, a 4-ethylcarbonyloxybutyl group, a sulfomethyl group, a 2-sulfoethyl group, a 3-sulfopropyl group, a 4-sulfobutyl group, a sulfamoylmethyl group, a 2-sulfamoylethyl group, a 3-sulfamoylpropyl group and a 4-sulfamoylbutyl group.

Among the preferable examples of the alkyl group represented by $R_6$ and $R_7$ listed above, a hydrogen atom and an alkyl group having 4 or less carbon atoms are particularly preferred, especially where $R_6$ is a hydrogen atom or a methyl group and $R_7$ is a hydrogen atom, a methyl group or an ethyl group.

Examples of the alkyl or cycloalkyl group represented by $R_8$ and $R_9$ include an alkyl group having 4 or less carbon atoms and a cycloalkyl group having from 4 to 7 carbon atoms, said alkyl or cycloalkyl group being unsubstituted or being substituted by one or two substituents selected from a group consisting of a hydroxyl group, a cyano group, an alkoxy group having 4 or less carbon atoms, a halogen atom, a carbamoyl group, a carboxyl group, a sulfo group, a sulfamoyl group, an acetyl amino group, a dimethyl amino group, a carboxylic acid ester group, a sulfonic acid ester group, a sulfate group and a phenyl group. Among the examples listed above, an unsubstituted alkyl group or an alkyl group substituted by one or two substituents selected from a group consisting of a hydroxyl group, an alkoxy group having 4 or less carbon atoms, a chlorine atom, a carboxyl group, a sulfo group, a sulfamoyl group, a carbamoyl group, a sulfate group and a phenyl group are preferred, and more preferred examples include a methyl group, an ethyl group, an n-propyl group, an isopropyl group, a n-butyl group, an isobutyl group, a sec-butyl group, a 2-hydroxyethyl group, a 2-sulfatoethyl group, a 2-sulfoethyl, a methoxyethyl group, a 2-carboxyethyl group, a 2-carbamoylethyl group, a 2-sulfamoyl ethyl group and a benzyl group. $R_8$ and $R_9$ may also represent 6-carboxyhexyl group.

The phenyl group as the substituent of the alkyl group represented by $R_8$ and $R_9$ may be further substituted by one or two substituents selected from a group consisting of an alkyl group having 4 or less carbon atoms, an alkoxy group having 4 or less carbon atoms, a sulfo group, a carboxyl group and a halogen atom. As the alkyl group represented by $R_8$ and $R_9$ and substituted by a phenyl group, an unsubstituted benzyl group or a benzyl group substituted by an above-mentioned preferred substituent is preferred, and, among them, more preferred is an unsubstituted benzyl group or a methyl group substituted by 2-sulfophenyl, 3-sulfophenyl or 4-sulfophenyl.

Examples of the phenyl group represented by $R_8$ and $R_9$ include an unsubstituted phenyl group and a phenyl group substituted by one or more substituent selected from an alkyl group having 4 or less carbon atoms, an alkoxy group having 4 or less carbon atoms, a sulfo group, a carboxyl group, a halogen atom, a hydroxyl group, a cyano group, a sulfamoyl group, a sulfomethyl group, a carbamoyl group, an alkoxy carbonyl group, 2-hydroxyethylsulfonyl group, an amino group, an acylamino group and an amino group substituted by an alkyl group, preferably substituted by an alkyl group having 4 or less carbon atoms. Among the phenyl group, an unsubstituted phenyl and a phenyl substituted by one or two substituents selected from an alkyl group having 4 or less carbon atoms, an alkoxy group having 4 or less carbon atoms, a sulfo group, a carboxyl group, a hydroxy group, a chlorine atom or a bromine atom is preferred, and more preferred is an unsubstituted phenyl, 2-carboxyl phenyl, 3-carboxyl phenyl, 4-carboxyl phenyl, 2- sulfophenyl, 3-sulfophenyl, 4-sulfophenyl, 2,4-disulfophenyl, 2,5-disulfophenyl, 2-chlorophenyl, 3-methylphenyl, 4-chlorophenyl, 2-methylphenyl, 3-methylphenyl, 4-methylphenyl, 2-methoxyphenyl, 3-methoxyphenyl, 4-methoxyphenyl-2-ethylphenyl, 3-ethylphenyl, 4-ethylphenyl, 2-ethoxyphenyl, 3-ethoxyphenyl, 4-ethoxyphenyl, 3-sulfo-4-methoxyphenyl, 2-hydroxyphenyl, 3-hydroxyphenyl and 4-hydroxyphenyl.

Examples of the cycloalkyl group represented by the $R_8$ and $R_9$ include an unsubstituted cyclohexyl group.

Examples of the naphthyl group represented by $R_8$ and $R_9$ include an unsubstituted naphthyl group and a naphthyl group substituted by 1, 2 or 3 substituents selected from a group consisting of a hydroxy group, a carboxyl group, a sulfo group, a halogen atom, an alkyl group having 4 or less carbon atoms and an alkoxy group having 4 or less carbon atoms. Preferred examples include naphthyl substituted by 1,2 or 3 sulfo group, e.g. 2-sulfo-1-naphthyl, 3-sulfo-1-naphthyl, 4-sulfo-1-naphthyl, 5-sulfo-1-naphthyl, 6-sulfo-1-naphthyl, 7-sulfo-1-naphthyl, 8-sulfo-1-naphthyl, 1-sulfo-2-naphthyl, 5-sulfo-2-naphthyl, 6-sulfo-2-naphthyl, 7-sulfo-2-naphthyl, 8-sulfo-2-naphthyl, 1,5-disulfo-2-naphthyl, 5,7-disulfo-2-naphthyl, 6,8-disulfo-2-naphthyl, 4,8-disulfo-2-naphthyl, 4,7-disulfo-2-naphthyl, 3,8-disulfo-2-naphthyl, 4,6-disulfo-2-naphthyl, 3,7-disulfo-2-naphthyl, 3,6-disulfo-2-naphthyl, 3,6,8-trisulfo-1-naphthyl, 4,6,8-trisulfo-1-naphthyl, 2,4,7-trisulfo-1-naphthyl, 1,5,7-trisulfo-2-naphthyl 4,6,8-trisulfo-2-naphthyl and 3,6,8-trisulfo-2-naphthyl.

Among the preferred examples of $R_8$ and $R_9$, particularly preferred case in view of the dye characteristics is where one of $R_8$ and $R_9$ is a hydrogen atom, a methyl group or an ethyl group and the other is a phenyl group unsubstituted or substituted by an alkyl group having 4 or less carbon atoms, an alkoxy group having 4 or less carbon atoms, a sulfo group, a carboxyl group or a halogen atom.

Examples of Z, the group removable by the action of an alkali, when Y represents a group —CH$_2$CH$_2$Z, include a sulfate group, a thiosulfate group, a phosphate group, a group OCOCH$_3$ and a halogen atom, among which sulfate group and a halogen atom, particularly a chlorine atom, are preferred. As Y in the formula (I), —CH=CH$_2$, —CH$_2$CH$_2$Cl and —CH$_2$CH$_2$OSO$_3$H are preferred.

n in the formula (I) is preferably 2 or 3.

The monoazo compound of the present invention may be in the free acid form or in a salt form thereof. Among the salts, an alkali metal salt or an alkaline earth metal salt is preferred, and particularly preferred is sodium salt, potassium salt or lithium salt.

The monoazo compound of the present invention can be produced, for example, by coupling a diazonium salt obtained by diazotizing an aromatic amine represented by the following formula (II):
wherein D represents same meaning as mentioned above, with a pyrazole derivative represented by the following formula (III-1):

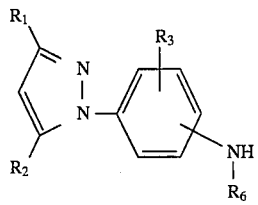

(III-1)

wherein $R_1$, $R_2$, $R_3$ and $R_6$ represent same meaning as mentioned above,
so that the diazonium salt couples at the 4-position of the pyrazole derivative,
or with a pyridone derivative represented by the following formula (III-2):

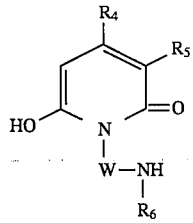

(III-2)

wherein $R_4$, $R_5$, $R_6$ and W represent same meaning as mentioned above;
and carrying out a condensation reaction of
—$NHR_6$ of the pyrazole derivative or the pyridone derivative,
—$NHR_7$ of an aliphatic amine represented by the following formula (IV):

$$HNR_7(CH_2)n—SO_2—Y \qquad (IV)$$

wherein $R_7$, n and Y represent same meaning as mentioned above, and an amine represented by the following formula (V):

$$HNR_8R_9 \qquad (V)$$

wherein $R_8$ and $R_9$ represent same meaning as mentioned above, with each of the halogen atoms of a 2,4,6-trihalogeno-s-triazine. The order of the coupling reaction and the condensation reactions is not limited.

As examples of the producing methods when a pyrazolone derivative of the formula (III-1) is used, following methods 1–4 can be mentioned.

Method 1

A diazonium salt obtained by a diazotization of an aromatic amine of the formula(II)is subjected to a coupling reaction with a pyrazolone derivative of the formula (III-1). under weakly acidic or weakly alkaline conditions to obtain a monoazo compound represented by the following formula (VI-1):

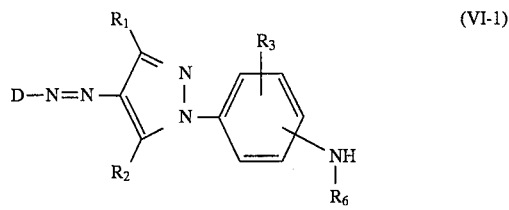

(VI-1)

wherein D, $R_1$, $R_2$, $R_3$ and $R_6$ represent the same meaning as mentioned above,
then, the monoazo compound of the formula (VI-1), an aliphatic amine of the formula (IV), and an amine of the formula (V) are subjected to condensation reactions with 2,4,6-trihalogeno-s-triazine to obtain the compound of formula (I) or a salt thereof.

Order among the condensation reactions with 2,4,6-trihalogeno-s-triazine is not limited. Although the conditions of the condensation reactions are not limited particularly, usually the condensation reaction with the unsubstituted 2,4,6-trihalogeno-s-triazine is conducted at the reaction temperature in a range of −10° C. to 40° C. and the pH in a range of 2 to 9; the condensation reaction with the monosubstituted 2,4,6-trihalogeno-s-triazine is conducted at the temperature in a range of 0° C. to 70° C. and the pH in a range of 2 to 9; and the condensation reaction with the disubstituted 2,4,6-trihalogeno-s-triazine is conducted at the temperature in a range of 10° C. to 100° C. and the pH in a range of 2 to 7.

Method 2

A condensation reaction of a pyrazolone derivative of the formula (III-1) with 2,4,6-trihalogeno-s-triazine is conducted, followed by coupling a diazonium salt obtained by a diazotization of an aromatic amine of the formula (II) with the reaction product under weakly acidic or weakly alkaline conditions to obtain a coupled compound. Then, an aliphatic amine of the formula (IV), and an amine of the formula (V) are subjected to condensation reactions with the coupled compound to obtain the compound of formula (I) or a salt thereof.

Usually the condensation reaction of the pyrazolone derivative of the formula (III-1) with the unsubstituted 2,4,6-trihalogeno-s-triazine is conducted at the reaction temperature in a range of −10° C. to 40° C. and the pH in a range of 2 to 9. The condensation reaction of the amines with the monosubstituted 2,4,6-trihalogeno-s-triazine, i.e. the coupled compound, is conducted at the temperature in a range of 10° C. to 70° C. and the pH in a range of 2 to 9; and the condensation reaction with the disubstituted 2,4,6-trihalogeno-s-triazine is conducted at the temperature in a range of 30° C. to 90° C. and the pH in a range of 2 to 9.

Method 3

A condensation reaction of a pyrazolone derivative of the formula (III-1) and an aliphatic amine of the formula (IV) with 2,4,6-trihalogeno-s-triazine is conducted. Order of the condensation reactions is not limited. Then, the reaction product is subjected to a coupling reaction, under weakly acidic or weakly alkaline conditions, with a diazonium salt obtained by a diazotization of an aromatic amine of the formula (II) to obtain a coupled compound. Thereafter, a condensation reaction of the coupled compound and an amine of the formula (V) is conducted to obtain the compound of formula (I) or a salt thereof.

Usually the condensation reaction of the pyrazolone derivative of the formula (III-1) or an aliphatic amine of the formula (IV) with the unsubstituted 2,4,6-trihalogeno-s-triazine is conducted at the reaction temperature in a range of −10° C. to 40° C. and the pH in a range of 2 to 9. And the condensation reaction of the pyrazolone derivative of the formula (III-1) or an aliphatic amine of the formula (IV) with the monosubstituted 2,4,6-trihalogeno-s-triazine is conducted at the temperature in a range of 0° C. to 70° C. and the pH in a range of 2 to 9; and the condensation reaction of an amine of the formula (V) with the disubstituted 2,4,6-trihalogeno-s-triazine, i.e. the coupled compound, is conducted at the temperature in a range of 20° C. to 90° C. and the pH in a range of 2 to 9.

Method 4

A pyrazolone derivative of the formula (III-1), an aliphatic amine of the formula (IV) and an amine of the formula (V) are subjected to condensation reactions with 2,4,6-trihalogeno-s-triazine. Order of the condensation reactions is not limited. Usually the condensation reaction with the unsubstituted 2,4,6-trihalogeno-s-triazine is conducted at the reaction temperature in a range of −10° C. to 40° C. and the pH in a range of 2 to 9; the condensation reaction with the monosubstituted 2,4,6-trihalogeno-s-triazine is conducted at the temperature in a range of 0° C. to 70° C. and the pH in a range of 2 to 9; and the condensation reaction with the disubstituted 2,4,6-trihalogeno-s-triazine is conducted at the temperature in a range of 10° C. to 90° C. and the pH in a range of 2 to 7.

Thereafter, the reaction product is subjected to a coupling reaction with a diazonium salt obtained by a diazotization of an aromatic amine of the formula (II) under weakly acidic or weakly alkaline conditions to obtain the compound of formula (I) or a salt thereof.

As examples of the producing methods when a pyridone derivative of formula (III-2) is used, following methods 5–8 can be mentioned.

Method 5

A diazonium salt obtained by a diazotization of an aromatic amine of the formula (II) is subjected to a coupling reaction with a pyridone derivative of the formula (III-2) under weakly acidic or weakly alkaline conditions to obtain a monoazo compound represented by the following formula (VI-2):

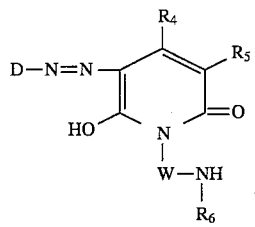

(VI-2)

wherein D, $R_4$, $R_5$, $R_6$ and W represent the same meaning as mentioned above, then, the monoazo compound of the formula (VI-2), an aliphatic amine of the formula (IV), and an amine of the formula (V) are subjected to condensation reactions with 2,4,6-trihalogeno-s-triazine to obtain the compound of formula (I) or a salt thereof.

Order among the condensation reactions with 2,4,6-trihalogeno-s-triazine is not limited. Although the conditions of the condensation reactions are not limited particularly, usually the condensation reaction with the unsubstituted 2,4,6-trihalogeno-s-triazine is conducted at the reaction temperature in a range of −10° C. to 40° C. and the pH in a range of 1 to 10; the condensation reaction with the monosubstituted 2,4,6-trihalogeno-s-triazine is conducted at the temperature in a range of 0° C. to 70° C. and the pH in a range of 2 to 10; and the condensation reaction with the disubstituted 2,4,6-trihalogeno-s-triazine is conducted at the temperature in a range of 10° C. to 100° C. and the pH in a range of 2 to 9.

Method 6

A condensation reaction of a pyridone derivative of the formula (III-2) with 2,4,6-trihalogeno-s-triazine is conducted, followed by coupling a diazonium salt obtained by a diazotization of an aromatic amine of the formula (II) with the reaction product under weakly acidic or weakly alkaline conditions to obtain a coupled compound. Then, an aliphatic amine of the formula (IV), and an amine of the formula (V) are subjected to condensation reactions with the coupled compound to obtain the compound of formula (I) or a salt thereof.

Usually the condensation reaction of the pyridone derivative of the formula (III-2) with the unsubstituted 2,4,6-trihalogeno-s-triazine is conducted at the reaction temperature in a range of −10° C. to 40° C. and the pH in a range of 2 to 9. The condensation reaction of the amines with the monosubstituted 2,4,6-trihalogeno-s-triazine, i.e. the coupled compound, is conducted at the temperature in a range of 10° C. to 70° C. and the pH in a range of 2 to 9; and the condensation reaction with the disubstituted 2,4,6-trihalogeno-s-triazine is conducted at the temperature in a range of 20° C. to 90° C. and the pH in a range of 2 to 9.

Method 7

A condensation reaction of a pyridone derivative of the formula (III-2) and an aliphatic amine of the formula (IV) with 2,4,6-trihalogeno-s-triazine is conducted. Order of the condensation reactions is not limited. Then, the reaction product is subjected to a coupling reaction, under weakly acidic or weakly alkaline conditions, with a diazonium salt obtained by a diazotization of an aromatic amine of the formula (II) to obtain a coupled compound. Thereafter, a condensation reaction of the coupled compound and an amine of the formula (V) is conducted to obtain the compound of formula (I) or a salt thereof.

Usually the condensation reaction of the pyridone derivative of the formula (III-2) or an aliphatic amine of the formula (IV) with the unsubstituted 2,4,6-trihalogeno-s-triazine is conducted at the reaction temperature in a range of −10° C. to 40° C. and the pH in a range of 2 to 9. And the condensation reaction of the pyridone derivative of the formula (III-2) or an aliphatic amine of the formula (IV) with the monosubstituted 2,4,6-trihalogeno-s-triazine is conducted at the temperature in a range of 0° C. to 70° C. and the pH in a range of 2 to 9; and the condensation reaction of an amine of the formula (V) with the disubstituted 2,4,6-trihalogeno-s-triazine, i.e. the coupled compound, is conducted at the temperature in a range of 20° C. to 90° C. and the pH in a range of 2 to 9.

Method 8

A pyridone derivative of the formula (III-2), an aliphatic amine of the formula (IW) and an amine of the formula (V) are subjected to condensation reactions with 2,4,6-trihalogeno-s-triazine. Order of the condensation reactions is not limited. Usually the condensation reaction with the unsubstituted 2,4,6-trihalogeno-s-triazine is conducted at the reaction temperature in a range of −10° C. to 40° C. and the pH in a range of 1 to 10; the condensation reaction with the monosubstituted 2,4,6-trihalogeno-s-triazine is conducted at the temperature in a range of 0° C. to 70° C. and the pH in a range of 2 to 10; and the condensation reaction with the disubstituted 2,4,6-trihalogeno-s-triazine is conducted at the temperature in a range of 10° C. to 100° C. and the pH in a range of 2 to 9.

Thereafter, the reaction product is subjected to a coupling reaction with a diazonium salt obtained by a diazotization of an aromatic amine of the formula (II) under weakly acidic or weakly alkaline conditions to obtain the compound of formula (I) or a salt thereof. Methods for producing a monoazo compound of the present invention are not limited to those mentioned above.

Examples of 2,4,6-trihalogeno-s-triazine include cyanuric chloride and cyanuric fluoride.

Examples of aromatic amines of the formula (II) include
2-aminobenzene sulfonic acid,
3-aminobenzene sulfonic acid,
4-aminobenzene sulfonic acid,
2-amino-5-methylbenzene sulfonic acid,
2-amino-5-ethylbenzene sulfonic acid,
2-amino-5-methoxybenzene sulfonic acid,
2-amino-5-ethoxybenzene sulfonic acid,
2-amino-5-chlorobenzene sulfonic acid,
2-amino-5-bromobenzene sulfonic acid,
2-amino-5-acetylaminobenzene sulfonic acid,
2-amino-5-propionylaminobenzene sulfonic acid,
2-amino-5-nitrobenzene sulfonic acid,
2-amino-4-chloro-5-methylbenzene sulfonic acid,
2-amino-5-chloro-4-methylbenzene sulfonic acid
2-amino-4-methylbenzene sulfonic acid,
2-amino-4-ethylbenzene sulfonic acid,
2-amino-4-methoxylbenzene sulfonic acid,
2-amino-4-ethoxylbenzene sulfonic acid,
2-amino-4-chlorobenzene sulfonic acid,
2-amino-4-bromobenzene sulfonic acid,
3-amino-4-methylbenzene sulfonic acid,
3-amino-4-ethylbenzene sulfonic acid,
3-amino-4-methoxybenzene sulfonic acid,
3-amino-4-ethoxybenzene sulfonic acid,
3-amino-4-chlorobenzene sulfonic acid,
3-amino-4-bromobenzene sulfonic acid,
4-amino-3-methylbenzene sulfonic acid,
4-amino-3-ethylbenzene sulfonic acid,
4-amino-3-methoxybenzene sulfonic acid,
4-amino-3-ethoxybenzene sulfonic acid,
4-amino-3-chlorobenzene sulfonic acid,
4-amino-3-bromobenzene sulfonic acid,
4-amino-3-nitrobenzene sulfonic acid,
2-aminobenzene-1,4-disulfonic acid,
2-aminobenzene-1,5-disulfonic acid,
2-aminobenzoic acid,
2-amino-4-methoxy benzoic acid,
2-amino-5-methoxy benzoic acid,
2-amino-4-acetylamino benzoic acid,
2-amino-5-acetylamino benzoic acid,
2-amino-4-sulfo benzoic acid,
2-amino-5-sulfo benzoic acid,
4-amino-2,5-dimethylbenzene sulfonic acid,
4-amino-2,5-diethylbenzene sulfonic acid,
4-amino-2,5-dimethoxybenzene sulfonic acid,
4-amino-2,5-diethoxybenzene sulfonic acid,
4-amino-2,5-dichlorobenzene sulfonic acid,
4-amino-2,5-dibromobenzene sulfonic acid,
4-amino-2-methyl-5-methoxybenzene sulfonic acid,
4-amino-2-methyl-5-ethoxybenzene sulfonic acid,
2-amino-5-methylbenzene-1,4-disulfonic acid,
2-amino-5-ethylbenzene-1,4-disulfonic acid,
2-amino-5-methoxybenzene-1,4-disulfonic acid,
2-amino-5-ethoxybenzene-1,4-disulfonic acid,
2-amino-5-acetylaminobenzene-1,4-disulfonic acid,
2-amino-5-propionylamino benzene-1,4-disulfonic acid,
2-aminonaphthalene-1-sulfonic acid,
2-aminonaphthalene-1,5-disulfonic acid,
2-aminonaphthalene-1,7-disulfonic acid,
2-aminonaphthalene-3,6-disulfonic acid,
2-aminonaphthalene-3,8-disulfonic acid,
2-aminonaphthalene-4,8-disulfonic acid,
2-aminonaphthalene-6,8-disulfonic acid,
2-aminonaphthalene-1,5,7-trisulfonic acid,
2-aminonaphthalene-3,6,8-trisulfonic acid and
2-aminonaphthalene-4,6,8-trisulfonic acid.

Examples of amines represented by the formula (V) include
ammonia, aminobenzene, 1-amino-2-methylbenzene, 1-amino-3-methylbenzene, 1-amino-4-methylbenzene, 1-amino-2,4-dimethylbenzene, 1-amino-3,5-dimethylbenzene 1-amino-3,4-dimethylbenzene, 1-amino-2-ethylbenzene, 1-amino-3-ethylbenzene, 1-amino-4-ethylbenzene, 1-amino-2-methoxybenzene, 1-amino-3-methoxybenzene, 1-amino-4-methoxybenzene, 1-amino-2-ethoxybenzene, 1-amino-3-ethoxybenzene, 1-amino-4-ethoxybenzene, 1-amino-2-chlorobenzene, 1-amino-3-chlorobenzene, 1-amino-4-chlorobenzene, 1-amino-2-bromobenzene, 1-amino-3-bromobenzene, 1-amino-4-bromobenzene, 1-amino-2-fluorobenzene, 1-amino-3-fluorobenzene, 1-amino-4-fluorobenzene, 3-aminophenylmethane sulfonic acid, 4-aminophenylmethane sulfonic acid, 2-aminobenzene-sulfonic acid, 3-aminobenzene-sulfonic acid, 4-aminobenzene-sulfonic acid, 3-methylaminobenzene-sulfonic acid, 4-methylaminobenzene-sulfonic acid, 3-ethylaminobenzenesulfonic acid, 4-ethylaminobenzene-sulfonic acid, 5-aminobenzene-1,3-disulfonic acid, 4-aminobenzene-1,3-disulfonic acid, 2-aminobenzene-1,4-disulfonic acid, 4-aminobenzene-1,2-disulfonic acid, 4-amino-5-methylbenzene-1,2-disulfonic acid, 2-aminobenzoic acid, 3-aminobenzoic acid, 4-aminobenzoic acid, 5-aminobenzene-1,3-dicarboxylic acid, 5-amino-2-hydroxybenzene sulfonic acid, 4-amino-2-hydroxybenzene sulfonic acid, 5-amino-2-ethoxybenzene sulfonic acid N-methylamino benzene, N-ethylamino benzene, 1-methylamino-3-methylbenzene, 1-methylamino-4-methylbenzene, 1-ethylamino-4-chlorobenzene, 1-ethylamino-4-methylbenzene, 1-ethylamino-3-methylbenzene, 1-(2-hydroxyethyl)amino-3-methyl benzene, 3-methylamino benzoic acid, 4-methylamino benzoic acid, 3-methylamino benzene sulfonic acid, 4-methylamino benzene sulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 8-aminonaphthalene-2-sulfonic acid, 7-methylamino naphthalene-2-sulfonic acid, 7-ethylamino naphthalene-2-sulfonic acid, 7-butylamino naphthalene-2-sulfonic acid, 7-isobutylamino naphthalene-2-sulfonic acid, 4-aminonaphthalene-1,3-disulfonic acid, -5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 3-aminonaphthalene-1,6-disulfonic acid, 4-aminonaphthalene-1,6-disulfonic acid, 7-aminonaphthalene-1,6-disulfonic acid, 8-aminonaphthalene-1,6-disulfonic acid, 3-aminonaphthalene-1,7-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 8-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid, 4-aminonaphthalene-1,3,7-trisulfonic acid, methyl amine, ethyl amine, n-propyl amine, isopropyl amine, n-butyl amine, isobutyl amine, sec-butyl amine, dimethyl amine, diethyl amine, methylethyl amine, allyl amine, 2-chloroethyl amine, 2-methoxyethyl amine, 2-amino ethanol, 2-methylamino ethanol, bis (2-hydroxyethyl)amine, 2-acetylamino ethylamine, 1-amino-2-propanol, 3-methoxy propylamine, 1-amino-3-dimethylamino propane, 2-aminoethane sulfonyl amide, 2-aminoethane sulfonic acid, aminomethane sulfonic acid, 2-methylaminoethane sulfonic acid, 2-methylaminoethane sulfonyl amide, 3-amino-1-propane sulfonic acid, 2-sulfatoethyl amine, amino acetic acid, methylamino acetic acid, 3-amino propionic acid, 3-aminopropionyl amide, 3-methylamino propionylamide, 3-methylamino propionic acid, ε-aminocaproic acid, benzylamine, 2-sulfobenzyl amine, 3-sulfobenzyl amine, 4-sulfobenzyl amine, 2-chlorobenzyl amine, 3-chlorobenzyl amine, 4-chlorobenzyl amine, 2-methylbenzyl amine, 3-methylbenzyl amine, 4-methylbenzyl amine, N-methylbenzyl amine, 2-phenylethyl amine, 1-phenylethyl amine, and 1-phenyl-2-propylamine.

Among them, preferred examples of an amine compound of the formula (V) include amino benzene, N-methylamino benzene, N-ethylamino benzene, 2-chloroamino benzene, 3-chloroaminobenzene, 4-chloroamino benzene, N-methyl-2-chloroamino benzene, N-methyl-3-chloroamino benzene, N-methyl-4-chloroamino benzene, N-ethyl-2-chloroamino benzene, N-ethyl-3-chloroamino benzene, N-ethyl-4-chloroamino benzene, 2-methylamino benzene, 2-ethylamino benzene, 3-methylamino benzene, 3-ethylamino benzene, 4-methylamino benzene, 4-ethylamino benzene, 2-methoxyamino benzene, 2-ethoxyamino benzene, 3-methoxyamino benzene, 3-ethoxyamino benzene, 4-methoxyamino benzene, 4-ethoxyamino benzene, 2-hydroxyamino benzene, 3-hydroxyamino benzene, 4-hydroxyamino benzene, aminobenzene-2-sulfonic acid, aminobenzene-3-sulfonic acid, aminobenzene-4-sulfonic acid, 3-methylamino benzene sulfonic acid, 4-methylamino benzene sulfonic acid, 3-ethylamino benzene sulfonic acid, 4-ethylamino benzene sulfonic acid, 2-carboxyamino benzene, 3-carboxyamino benzene, 4-carboxyamino benzene, ammonia, methyl amine, ethyl amine, dimethyl amine, 2-aminoethane sulfonic acid, , 2-methylaminoethane sulfonic acid, 2-amino ethanol, bis (2-hydroxyethyl)amine, 2-aminoethane sulfonyl amide and 3-amino propionyl amide. Among them, particularly preferred is aminobenzene or a derivative thereof.

Monoazo compound of the present invention have a fiber reactive group and are useful as fiber-reactive dyes for dyeing or printing hydroxy- or carbonamide-containing materials. Examples of hydroxy-containing materials include natural or synthetic hydroxy-containing materials, such as a cellulose fiber material, a-regenerated cellulose and polyvinyl alcohol. Among the cellulose fiber materials cotton, hemp, linen, jute andramie fibers are preferred. Examples of the regenerated cellulose fiber include viscose staple and filament viscose.

Examples of the carbonamide-containing materials include natural or synthetic polyamides, polyurethane and leathers, particularly fiber type materials such as wool or other hair of animal, silk, polyamide-6,6, polyamide-6, polyamide-11, polyamide-4 can be mentioned.

Materials to be dyed or printed are preferably a fiber-type material or a mixed yarn of fiber materials. The dyeing or printing by using a compound of the present invention is carried out on the above mentioned material, particularly that of a fiber material in a manner depending on physicochemical properties of the material.

For example, exhaustion dyeing on a cellulose fiber material can be carried out at a relatively low temperature in the presence of an acid binding agent such as sodium carbonate, sodium tertiary phosphate or sodium hydroxide and optionally a neutral salt such as sodium sulfate or sodium chloride and, if desired together with a dissolving assistant, a penetrant or a level dyeing agent. The neutral salt used for promoting the exhaustion of the dye may be added either after the intended dyeing temperature has been attained or before it. The neutral salt may be added in several portions.

Dyeing on a cellulose fiber material according to a padding method can be carried out by padding the material at room temperature or an elevated temperature, followed by drying and, then, steaming or dry-heating the padded material to perform dye fixation. Padding on cellulose fiber materials can be carried out by a one phase padding manner or a two phase padding manner.

The one-phase printing may be conducted by printing the fiber-materials with a printing paste containing an acid-binding agent such as sodium bicarbonate and the like, followed by steaming at a temperature of 95° C. to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment. For the preparation of the printing paste, a paste or emulsifier such as sodium alginate or starch ether is used optionally together with a conventional printing assistant such as urea and/or a dispersant.

As examples of the acid binding agent suitable for fixing the compound of the present invention onto cellulose, fiber, water-soluble basic salts formed between an alkali metal or an alkaline earth metal and an inorganic or organic acid or a compound liberating alkali in a heated state can be referred to. Particularly, alkali metal salts formed between an alkali metal hydroxide and an inorganic or organic acid of weak or medium strength are preferable. Among which sodium salts and potassium salts are more preferable. Examples of such acid binding agent include sodium hydroxide, potassium hydroxide, sodium bicarbonate, sodium carbonate, sodium formate, potassium carbonate, sodium primary phosphate, sodium secondary phosphate, sodium tertiary phosphate, sodium silicate and sodium trichloroacetate.

The dyeing of synthetic and natural polyamide and polyurethane fibers can be carried out by performing exhaustion in an acid or weak acid bath at a controlled pH value and then making the bath neutral or in some cases alkaline to perform fixation. The dyeing temperature is usually from 60° C. to 120° C. In order to achieve a level dyeing, there may be used a conventional level dyeing agent such as a condensation product between cyanuric chloride and 3 times by mole of aminobenzene sulfonic acid aminonaphthalene to sulfonic acid or an addition product of stearylamine to ethylene oxide.

The compound of the present invention is characterized in that it exhibits excellent performance in dyeing and printing fiber materials. It is particularly useful for dyeing cellulose fiber materials, and gives a dyed product excellent in light fastness, perspiration-light fastness, wet fastness such as washing resistance, peroxide-washing resistance, perspiration resistance, hydrolysis resistance against acid and alkali resistance and further in abrasion fastness and iron fastness. It is further characterized in that it is excellent in build-up, level-dyeing and wash-off properties and high solubility as well as high exhaustion and fixation percentages. Moreover, it is characterized in that it is hardly affected by changes in dyeing temperature and dyeing bath ratio so that a dyed product with a stable quality can be obtained.

Moreover, the compound of the present invention is characterized in that a dyed product obtained by using the monoazo compound of the present invention exhibits small color change at the time of fixing treatment and resin treatment and exhibits small change due to contact with basic substances during storage.

The present invention will be illustrated in more detail by way of the following examples wherein parts and % are by weight.

EXAMPLE 1

According to a conventional method, 18.9 parts of 1-(4'-aminophenyl)-3-methylpyrazolone-5 and, then, 24.7 parts of 3-(2'-sulfatoethyl sulfonyl) propylamine were subjected to condensation reactions with 18.4 parts of cyanuric chloride. The reaction product was subjected to a coupling reaction with a diazonium salt obtained by a conventional diazotization of 30.3 parts of 2-aminonaphthalene-1,5-disulfonic acid, followed by a conventional condensation reaction with 17.3 parts of 3-aminobenzene sulfonic acid. The reaction mass thus obtained was salted out with sodium chloride to obtain a pyrazolone monoazo compound the free acid form of which is represented by the following formula:

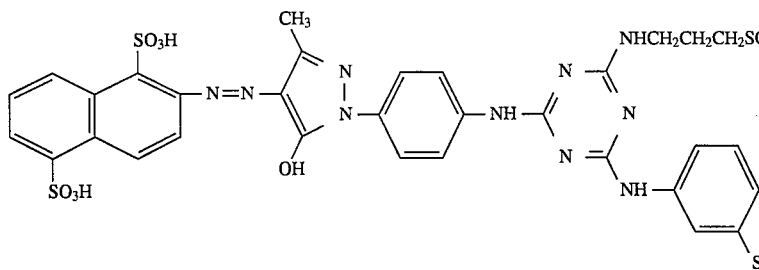

λ max. measured in an aqueous medium is 410 nm.

EXAMPLE 2

26.9 parts of 1-(2'-sulfo-4'-aminophenyl)-3-methylpyrazolone-5 was subjected to a coupling reaction with a diazonium salt obtained by a conventional diazotization of 30.3 parts of 2-aminonaphthalene-1,5-disulfonic acid to obtain a compound the free acid form of which is represented by the following formula:

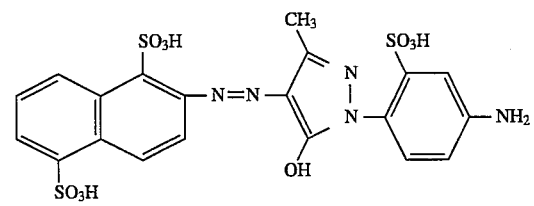

According to a conventional method, whole of the reaction product thus obtained, 24.7 parts of 3-(2'-sulfatoethyl sulfonyl) propylamine and 17.3 parts of 3-aminobenzene sulfonic acid were subjected to condensation reactions with 18.4 parts of cyanuric chloride. The reaction mass thus obtained was salted out with sodium chloride to obtain a pyrazolone monoazo compound the free acid form of which is represented by the following formula:

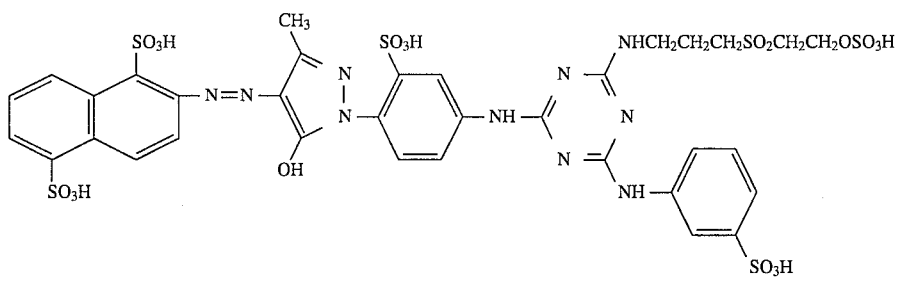

EXAMPLE 3

Example 1 was repeated except that 2-aminonaphthalene-1,5-disulfonic acid was replaced by each of compounds listed in column A of the following Table 1, 1-(4'-aminophenyl)-3-methylpyrazolone-5 was replaced by each of compounds listed in column B of the following Table 1, 3-(2'-sulfatoethylsulfonyl)propylamine was replaced by each of compounds listed in column C of the following Table 1, and 3-aminobenzene sulfonic acid was replaced by each of compounds listed in column D of the following Table 1 to obtain a pyrazolone monoazo compound having yellow color.

TABLE 1-1

| No. | A | B | C | D |
|---|---|---|---|---|
| 1 | ![A1] | ![B1] | $H_2NC_2H_4SO_2C_2H_4OSO_3H$ | ![D1] |
| 2 | ![A2] | ![B2] | $H_2NC_3H_6SO_2C_2H_4OSO_3H$ | ![D2] |
| 3 | ![A3] | " | $H_2NC_2H_4SO_2C_2H_4OSO_3H$ | ![D3] |
| 4 | " | ![B4] | " | ![D4] |
| 5 | ![A5] | " | $H_2NC_3H_6SO_2C_2H_4OSO_3H$ | ![D5] |

TABLE 1-2
| No. | A | B | C | D |
|---|---|---|---|---|
| 6 | 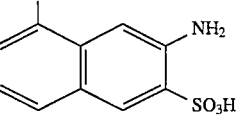 | 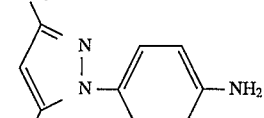 | H₂NC₂H₄SO₂C₂H₄OSO₃H | 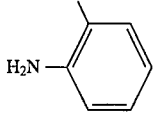 |
| 7 | 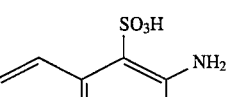 | 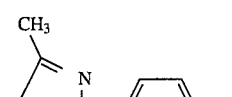 | " | 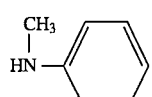 |
| 8 | 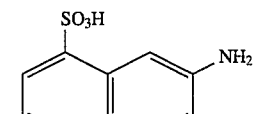 | " | " | 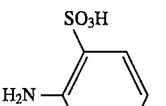 |
| 9 | 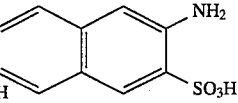 | " | H₂NC₃H₆SO₂C₂H₄OSO₃H | 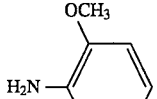 |
| 10 | 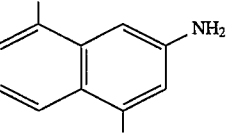 | 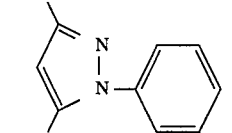 | " | 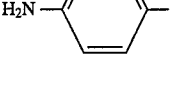 |
TABLE 1-3
| No. | A | B | C | D |
|---|---|---|---|---|
| 11 | 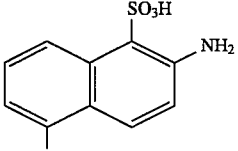 | 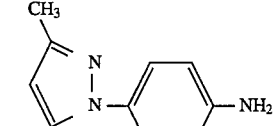 | CH₃<br>\|<br>HNC₂H₄SO₂C₂H₄OSO₃H | 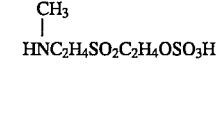 |
| 12 | 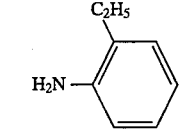 | 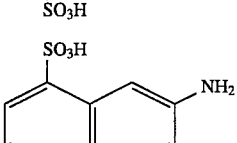 | " | 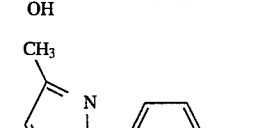 |
| 13 | 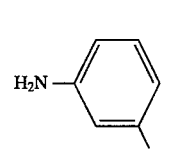 | 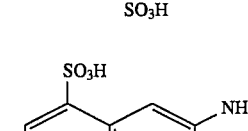 | H₂NC₃H₆SO₂CH=CH₂ | 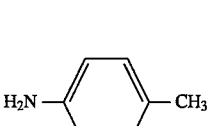 |

TABLE 1-3-continued

| No. | A | B | C | D |
|-----|---|---|---|---|
| 14 | HO₃S-naphthalene-NH₂ with SO₃H | " | H₂NC₂H₄SO₂CH=CH₂ | 2,5-disubstituted benzene: H₂N, SO₃H |
| 15 | naphthalene with SO₃H (1,5,7 positions) and NH₂ (and additional SO₃H) | " | CH₃ / HNC₃H₆SO₂C₂H₄OSO₃H | H₂N-phenyl (aniline) |

TABLE 1-4

| No. | A | B | C | D |
|-----|---|---|---|---|
| 16 | naphthalene with SO₃H, NH₂, SO₃H | CH₃-C=N-N(pyrazolone)-phenyl with SO₃H and NH₂; OH | H₂NC₂H₄SO₂C₂H₄Cl | H₂N-phenyl-SO₃H (meta) |
| 17 | benzene with SO₃H and NH₂ (ortho) | CH₃-C=N-N(pyrazolone)-phenyl-NH₂; OH | H₂NC₃H₆SO₂C₂H₄OSO₃H | H₂N-phenyl-CO₂H (ortho) |
| 18 | CH₃O-benzene with SO₃H and NH₂ | " | " | C₂H₅-HN-phenyl |
| 19 | CH₃-benzene with SO₃H and NH₂ | " | H₂NC₂H₄SO₂C₂H₄OSO₃H | H₂N-phenyl-OCH₃ (para) |
| 20 | Cl-benzene with SO₃H and NH₂ | CO₂H-C=N-N-phenyl-NH₂; OH | " | H₂N-phenyl-SO₃H (meta) |

TABLE 1-5

| No. | A | B | C | D |
|---|---|---|---|---|
| 21 | 2-amino-naphthalene-3,6,8-trisulfonic acid (SO₃H at 1,6; NH₂ at 3; SO₃H at also shown) | 3-methyl-1-(3-aminophenyl)-5-hydroxypyrazole (azo) | H₂NC₃H₆SO₂C₂H₄Cl | 4-chloro-N-ethylaniline (C₂H₅HN–C₆H₄–Cl) |
| 22 | 2-amino-5-methoxybenzenesulfonic acid (CH₃O, SO₃H, NH₂) | 3-methyl-5-amino-1-(4-aminophenyl)pyrazole | H₂NC₃H₆SO₂CH=CH₂ | 3-aminobenzenesulfonic acid (H₂N–C₆H₄–SO₃H) |
| 23 | 2-amino-naphthalene-1-sulfonic acid | 3-methyl-1-[3-(methylamino)phenyl]-5-hydroxypyrazole | H₂NC₂H₄SO₂C₂H₄OSO₃H | " |
| 24 | 2-amino-naphthalene-1,5-disulfonic acid | " | H₂NC₃H₆SO₂C₂H₄OSO₃H | 2-ethylaniline (C₂H₅, H₂N) |
| 25 | anthranilic acid (2-aminobenzoic acid, CO₂H, NH₂) | 3-methyl-1-[3-(ethylamino)phenyl]-5-hydroxypyrazole | H₂NC₂H₄SO₂C₂H₄OSO₃H | N-methylaniline (CH₃HN–C₆H₅) |

TABLE 1-6

| No. | A | B | C | D |
|---|---|---|---|---|
| 26 | 4-aminobenzenesulfonic acid (HO₃S–C₆H₄–NH₂) | 3-methyl-1-(4-aminophenyl)-5-hydroxypyrazole | H₂NC₂H₄SO₂C₂H₄OSO₃H | 2-amino-benzene-1,4-disulfonic acid (SO₃H, H₂N, SO₃H) |
| 27 | 2-amino-benzene-1,4-disulfonic acid (SO₃H, NH₂, SO₃H) | 3-methyl-1-(3-aminophenyl)-5-hydroxypyrazole | H₂NC₃H₆SO₂C₂H₄OSO₃H | 4-methoxyaniline (H₂N–C₆H₄–OCH₃) |

TABLE 1-6-continued

| No. | A | B | C | D |
|---|---|---|---|---|
| 28 | naphthalene with SO$_3$H (1), NH$_2$ (2), SO$_3$H (5) | HO-C=CH-C(CO$_2$H)=N-N(C$_2$H$_5$)-C$_6$H$_4$-NH- (ethyl on N, NH on para) | " | CH$_3$-HN-C$_6$H$_4$-Cl (para) |
| 29 | " | CH$_3$-C(=N-N(CH$_3$)-C$_6$H$_4$-NH-)=CH-C(NH$_2$)= (meta NHCH$_3$) | H$_2$NC$_2$H$_4$SO$_2$C$_2$H$_4$Cl | H$_2$N-C$_6$H$_4$-SO$_3$H (meta) |
| 30 | naphthalene with SO$_3$H (1), NH$_2$ (7), SO$_3$H (3) | CH$_3$-C(=N-N(-C$_6$H$_3$(SO$_3$H)(NH$_2$))-)=CH-C(OH)= | H$_2$NC$_2$H$_4$SO$_2$C$_2$H$_4$OSO$_3$H | H$_2$N-C$_6$H$_4$-CO$_2$H (ortho) |

30

TABLE 1-7

| No. | A | B | C | D |
|---|---|---|---|---|
| 31 | naphthalene with SO$_3$H (1), NH$_2$ (2), SO$_3$H (5) | CH$_3$-C(=N-N(-C$_6$H$_4$-NH$_2$)-)=CH-C(OH)= | H$_2$NC$_2$H$_4$SO$_2$C$_2$H$_4$OSO$_3$H | H$_3$N |
| 32 | naphthalene with SO$_3$H (1), NH$_2$ (3), SO$_3$H (5) | " | H$_2$NC$_3$H$_6$SO$_2$C$_2$H$_4$OSO$_3$H | H$_2$NCH$_2$CH$_3$ |
| 33 | naphthalene with SO$_3$H, NH$_2$, SO$_3$H, SO$_3$H | HO-C=CH-C(CO$_2$H)=N-N(-C$_6$H$_4$-NH$_2$)- (meta) | H$_2$NC$_2$H$_4$SO$_2$CH=CH$_2$ | H$_2$NCH$_2$CH$_2$CO$_2$H |
| 34 | naphthalene with SO$_3$H (1), NH$_2$ (7), SO$_3$H (3) | " | H$_2$NC$_2$H$_4$SO$_2$C$_2$H$_4$OSO$_3$H | HN(C$_2$H$_5$)$_2$ |

TABLE 1-7-continued

| No. | A | B | C | D |
|-----|---|---|---|---|
| 35 |  SO₃H, NH₂, SO₃H (naphthalene) | CH₃, N=N, OH, NH-CH₃ on phenyl | " | H₂NC₂H₄OCH₃ |

TABLE 1-8

| No. | A | B | C | D |
|-----|---|---|---|---|
| 36 | SO₃H, NH₂, SO₃H (benzene) | CH₃, N=N, OH, NH₂-phenyl | H₂NC₂H₄SO₂CH=CH₂ | H₂NCH₂CO₂H |
| 37 | CH₃O, SO₃H, NH₂ (benzene) | " | H₂NC₃H₆SO₂C₂H₄OSO₃H | HN(CH₂CH₂OH)₂ |
| 38 | SO₃H, NH₂, SO₃H (naphthalene) | " | H₂NC₂H₄SO₂C₂H₄Cl | H₂NCH₂CH₂SO₃H |
| 39 | SO₃H, NH₂, SO₃H (naphthalene) | CO₂H, N=N, OH, NH₂-phenyl | H₂NC₂H₄SO₂C₂H₄OSO₃H | H₂NCH₃ |
| 40 | SO₃H, NH₂, SO₃H (naphthalene) | " | " | H₂N—CH₂—phenyl |

Dyeing Example 1

Each of the monoazo compounds (0.3 part) obtained in Examples 1 to 3 was dissolved into 200 parts of water. 20 parts of sodium sulfate and, then, 10 parts of cotton were added thereto and the temperature was elevated to 60° C. After 30 minutes had passed since the temperature reached to 60° C., 4 parts of sodium carbonate was added and dyeing was carried out at that temperature for one hour. After completion of the dyeing, the dyed cotton was washed with water and soaping was conducted to obtain an vivid yellow-colored dyed product excellent in various fastness properties and build-up property.

Dyeing Example 2

Using each of the monoazo compounds obtained in Examples 1 to 3, a color paste having the following composition was prepared.

| | |
|---|---|
| Monoazo compound | 5 parts |
| Urea | 5 parts |
| Sodium alginate (5%) stock paste | 50 parts |
| Hot water | 25 parts |
| Sodium bicarbonate | 2 parts |
| Balance | 13 parts |

A mercerized cotton broad cloth was printed with each color paste. After intermediate drying, steaming was conducted at 100° C. for 5 minutes. Then, the cotton cloth was washed with hot water, soaped, washed with hot water and dried to obtain a vivid yellow printed product excellent in various fastness.

EXAMPLE 4

According to a conventional method, 16.8 parts of 1-(2'-aminoethyl)-4-methyl-6-hydroxy-2-pyridone and, then, 23.3 parts of 2-(2'-sulfatoethyl sulfonyl)ethylamine were subjected to condensation reactions with 18.4 parts of cyanuric chloride. The reaction product was subjected to a coupling reaction with a diazonium salt obtained by a conventional diazotization of 30.3 parts of 2-aminonaphthalene-1,5-disulfonic acid, followed by a conventional condensation reaction with 9.3 parts of aminobenzene. The reaction mass thus obtained was salted out with sodium chloride to obtain a pyridone monoazo compound the free acid form of which is represented by the following formula:

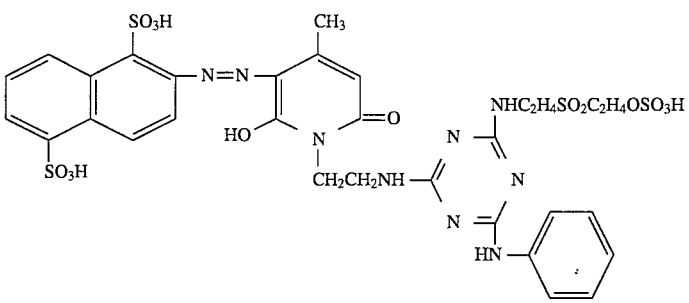

λ max. measured in an aqueous medium is 430 nm.

EXAMPLE 5

19.3 parts of 1-(2'-aminoethyl)-3-cyano-4-methyl-6-hydroxy-2-pyridone was subjected to a coupling reaction with a diazonium salt obtained by a conventional diazotization of 17.3 parts of 2-aminobenzene sulfonic acid to obtain a monoazo compound the free acid form of which is represented by the following formula:

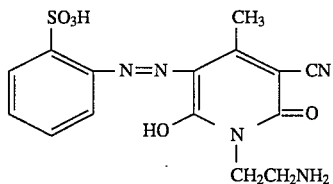

According to a conventional method, whole of the monoazo product thus obtained, 24.7 parts of 3-(2'-sulfatoethyl sulfonyl) propylamine and 17.3 parts of 3-aminobenzene sulfonic acid were subjected to condensation reactions with 18.4 parts of cyanuric chloride. The reaction mass thus obtained was salted out with sodium chloride to obtain a pyridone monoazo compound the free acid form of which is represented by the following formula:

λ max. measured in an aqueous medium is 420 nm.

EXAMPLE 6

Example 4 was repeated except that 2-aminonaphthalene-1,5-disulfonic acid was replaced by each of compounds listed in column A of the following Table 2, 1-(2'-aminoethyl)-4-methyl-6-hydroxy-2-pyridone was replaced by each of compounds listed in column B of the following Table 2, 2-(2'-sulfatoethyl sulfonyl) ethylamine was replaced by each of compounds listed in column C of the following Table 2, and aminobenzene was replaced by each of compounds listed in column D of the following Table 2 to obtain a corresponding pyridone monoazo compound.

TABLE 2-1

| No. | A | B | C | D |
|---|---|---|---|---|
| 1 | naphthalene with SO₃H (1), NH₂ (2), SO₃H (5) | 4-methyl-3-cyano-6-hydroxy-1-(C₂H₄NH₂)-pyridin-2-one | H₂NC₃H₆SO₂—C₂H₄OSO₃H | 3-aminobenzenesulfonic acid (H₂N, SO₃H) |
| 2 | naphthalene with SO₃H (1), NH₂ (3), SO₃H (5) drawn with SO₃H at 4-position | 4-methyl-3-carbamoyl-6-hydroxy-1-(C₂H₄NH₂)-pyridin-2-one | H₂NC₂H₄SO₂—C₂H₄Cl | 2-aminobenzoic acid (H₂N, CO₂H) |
| 3 | naphthalene with SO₃H (1), NH₂ (2), SO₃H (5) | 4-methyl-3-chloro-6-hydroxy-1-(C₂H₄NHCH₃)-pyridin-2-one | H₂NC₃H₆SO₂—C₂H₄Cl | 4-methoxyaniline (H₂N, OCH₃) |
| 4 | naphthalene with SO₃H (1), NH₂ (2), SO₃H (5) | 4-methyl-3-(CH₂SO₃H)-6-hydroxy-1-(C₂H₄NH₂)-pyridin-2-one | H₂NC₃H₆SO₂—C₂H₄OSO₃H | N-ethyl-4-chloroaniline (C₂H₅-HN, Cl) |
| 5 | naphthalene with SO₃H (1), NH₂ (2) | 4-methyl-3-SO₃H-6-hydroxy-1-(C₂H₄NH₂)-pyridin-2-one | H₂NC₂H₄SO₂—CH=CH₂ | 2-amino-1,4-benzenedisulfonic acid (SO₃H, H₂N, SO₃H) |
| 6 | naphthalene with SO₃H (1), NH₂ (3), SO₃H (5), SO₃H (7) | 4-methyl-6-hydroxy-1-(C₂H₄NHCH₃)-pyridin-2-one | H₂NC₂H₄SO₂—C₂H₄OSO₃H | 4-methylaniline (H₂N, CH₃) |
| 7 | naphthalene with SO₃H (1), NH₂ (3), SO₃H (5), SO₃H (7) | 4-methyl-3-carbamoyl-6-hydroxy-1-(C₂H₄NH₂)-pyridin-2-one | H₂NC₂H₄SO₂—C₂H₄OSO₃H | 3-amino-N-acetyl-aniline (H₂N, NHCO—CH₃) |

TABLE 2-2

| No. | A | B | C | D |
|---|---|---|---|---|
| 8 | 7-amino-naphthalene-1,3,6-trisulfonic acid (SO₃H at 1,3,6; NH₂ at 7) | 4-methyl-6-hydroxy-3-carbamoyl-1-(2-aminoethyl)-pyridin-2-one | $H_2NC_3H_6SO_2-C_2H_4OSO_3H$ | 4-chloroaniline |
| 9 | 7-amino-naphthalene-1,5-disulfonic acid | 4-methyl-6-hydroxy-3-carbamoyl-1-(2-aminoethyl)-pyridin-2-one | $H_2NC_2H_4SO_2-CH=CH_2$ | 3-aminobenzenesulfonic acid |
| 10 | 6-amino-naphthalene-1,3-disulfonic acid (2-amino with SO₃H at positions) | 4-ethyl-6-hydroxy-1-(2-aminoethyl)-pyridin-2-one | $H_2NC_2H_4SO_2-C_2H_4Cl$ | 2,5-disulfo aniline (H₂N with SO₃H groups) |
| 11 | 2-amino-naphthalene-1,5-disulfonic acid | 4-methyl-6-hydroxy-3-cyano-1-(3-aminopropyl)-pyridin-2-one with C₂H₅ | $H_2NC_2H_4SO_2-C_2H_4OSO_3H$ | 2,5-disulfo aniline (SO₃H at 2, SO₃H at 5) |
| 12 | 2-amino-naphthalene-1,5-disulfonic acid | 4-methyl-6-hydroxy-3-(sulfomethyl)-1-(3-aminopropyl)-pyridin-2-one | $H_2NC_2H_4SO_2-CH=CH_2$ | N-ethyl-4-chloroaniline |
| 13 | 2-amino-naphthalene-1,5-disulfonic acid | 4-methyl-6-hydroxy-3-sulfo-1-(3-aminopropyl)-pyridin-2-one | $H_2NC_3H_6SO_2-C_2H_4OSO_3H$ | N-methylaniline |
| 14 | 7-amino-naphthalene-1,3,6-trisulfonic acid | 4-methyl-6-hydroxy-3-sulfo-1-(3-aminopropyl)-pyridin-2-one | $H_2NC_3H_6SO_2-CH=CH_2$ | 4-aminobenzoic acid |

TABLE 2-3

| No. | A | B | C | D |
|-----|---|---|---|---|
| 15 | 7-amino-naphthalene-1,5-disulfonic acid (SO₃H at positions; NH₂) | 4-methyl-6-hydroxy-3-carbamoyl-1-(2-methyl-3-aminopropyl)-pyridin-2-one (CH₃, CONH₂, HO, N-CH₂CHCH₂NH₂ with CH₃) | H₂NC₂H₄SO₂—C₂H₄Cl | 2-amino-anisole (H₂N, OCH₃) |
| 16 | 2-amino-naphthalene-1-sulfonic acid | 4-methyl-6-hydroxy-1-(2-aminoethyl)-pyridin-2-one (C₂H₄NH₂) | H₂NC₂H₄SO₂—C₂H₄OSO₃H | 6-amino-naphthalene-1,3-disulfonic acid |
| 17 | 2-amino-naphthalene-1,5-disulfonic acid | 4-methyl-6-hydroxy-1-(2-aminoethyl)-pyridin-2-one (C₂H₄NH₂) | H₂NC₃H₆SO₂—C₂H₄OSO₃H | 6-amino-naphthalene-2-sulfonic acid |
| 18 | 3-amino-naphthalene-1,5-disulfonic acid | 4-methyl-6-hydroxy-1-[2-(methylamino)ethyl]-pyridin-2-one (C₂H₄NHCH₃) | H₂NC₂H₄SO₂—CH=CH₂ | 6-amino-naphthalene-1-sulfonic acid |
| 19 | 7-amino-naphthalene-1,5-disulfonic acid | 4-methyl-6-hydroxy-1-(3-aminopropyl)-pyridin-2-one (C₃H₆NH₂) | H₂NC₃H₆SO₂—C₂H₄Cl | 8-amino-naphthalene-6-sulfonic acid |
| 20 | 7-amino-naphthalene-1,3,6-trisulfonic acid | 4-methyl-6-hydroxy-1-(3-aminopropyl)-pyridin-2-one (C₃H₆NH₂) | H₂NC₂H₄SO₂—C₂H₄OSO₃H | 2-amino-naphthalene-1-sulfonic acid |
| 21 | 2-aminobenzenesulfonic acid | 4-methyl-6-hydroxy-1-(2-aminoethyl)-pyridin-2-one (C₂H₄NH₂) | H₂NC₃H₆SO₂—C₂H₄OSO₃H | N-methylaniline (CH₃, HN) |

TABLE 2-4

| No. | A | B | C | D |
|---|---|---|---|---|
| 22 | 2-amino-4-methylbenzenesulfonic acid (NH2 on ring, CH3 para-ish, SO3H) | 1-(2-aminoethyl)-6-hydroxy-4-methyl-2-pyridone (CH3, HO, N-C2H4NH2) | H₂NC₃H₆SO₂—C₂H₄OSO₃H | 3-aminobenzenesulfonic acid (H2N, SO3H) |
| 23 | 2-amino-4-methylbenzenesulfonic acid | 1-(2-methylaminoethyl)-6-hydroxy-4-methyl-2-pyridone (N-C2H4NHCH3) | H₂NC₂H₄SO₂—C₂H₄OSO₃H | 4-methoxyaniline (H2N, OCH3) |
| 24 | 2-amino-5-methoxybenzenesulfonic acid (SO3H, NH2, CH3O) | 1-(2-methylaminoethyl)-6-hydroxy-4-methyl-2-pyridone | H₂NC₂H₄SO₂—C₂H₄OSO₃H | 2-aminobenzoic acid (H2N, CO2H) |
| 25 | 2-amino-5-chlorobenzenesulfonic acid (SO3H, NH2, Cl) | 1-(2-aminoethyl)-3-carbamoyl-6-hydroxy-4-methyl-2-pyridone (CH3, CONH2, HO, N-C2H4NH2) | H₂NC₂H₄SO₂—C₂H₄OSO₃H | aniline (H2N) |
| 26 | 3-amino-4-methylbenzenesulfonic acid (SO3H, NH2, CH3) | 1-(2-aminoethyl)-6-hydroxy-4-methyl-3-sulfo-2-pyridone (CH3, SO3H, HO, N-C2H4NH2) | H₂NC₂H₄SO₂—CH=CH₂ | 4-ethylaniline (H2N, C2H5) |
| 27 | 4-amino-3-ethoxybenzenesulfonic acid (OC2H5, NH2, HO3S) | 3-chloro-1-(2-methylaminoethyl)-6-hydroxy-4-methyl-2-pyridone (CH3, Cl, HO, N-C2H4NHCH3) | H₂NC₂H₄SO₂—CH=CH₂ | 3-chloro-N-ethylaniline (C2H5, HN, Cl) |
| 28 | 2-aminobenzene-1,4-disulfonic acid (NH2, HO3S, SO3H) | 1-(3-aminopropyl)-6-hydroxy-4-methyl-2-pyridone (CH3, HO, N-C3H6NH2) | H₂NC₃H₆SO₂—C₂H₄OSO₃H | 6-aminonaphthalene-2-sulfonic acid (H2N, HO3S) |

TABLE 2-5
| No. | A | B | C | D |
|---|---|---|---|---|
| 29 | 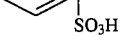 | 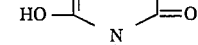 | H$_2$NC$_2$H$_4$SO$_2$—C$_2$H$_4$OSO$_3$H | 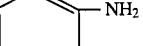 |
| 30 | 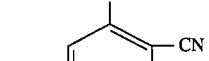 | 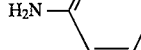 | H$_2$NC$_3$H$_6$SO$_2$—C$_2$H$_4$Cl | 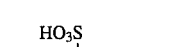 |
| 31 | 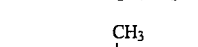 |  | H$_2$NC$_2$H$_4$SO$_2$—C$_2$H$_4$OSO$_3$H | H$_3$N |
| 32 | 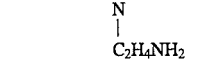 |  | H$_2$NC$_2$H$_4$SO$_2$—CH=CH$_2$ | H$_2$NC$_2$H$_5$ |
| 33 |  | 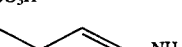 | H$_2$NC$_2$H$_4$SO$_2$—C$_2$H$_4$Cl | H$_2$NC$_2$H$_4$SO$_3$H |
| 34 | 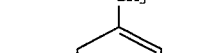 |  | H$_2$NC$_3$H$_6$SO$_2$—C$_2$H$_4$OSO$_3$H | H$_2$NCH$_3$ |
| 35 | 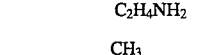 | | H$_2$NC$_3$H$_6$SO$_2$—C$_2$H$_4$OSO$_3$H | H$_2$NC$_2$H$_4$OC$_2$H$_5$ |

TABLE 2-6

| No. | A | B | C | D |
|---|---|---|---|---|
| 36 | 2-amino-naphthalene-1,6,8-trisulfonic acid (SO₃H at 1,6,8; NH₂ at 2) | 1-(2-methylaminoethyl)-3-cyano-4-methyl-6-hydroxy-2-pyridone | $H_2NC_2H_4SO_2-CH=CH_2$ | $HN(C_2H_4OH)_2$ |
| 37 | 2-amino-naphthalene-1,5-disulfonic acid | 1-(3-aminopropyl)-3-carbamoyl-4-methyl-6-hydroxy-2-pyridone | $H_2NC_2H_4SO_2-CH=CH_2$ | $H_2N-CH_2-C_6H_5$ |
| 38 | 2-aminobenzenesulfonic acid | 1-(2-aminoethyl)-3-sulfo-4-ethyl-6-hydroxy-2-pyridone | $H_2NC_3H_6SO_2-C_2H_4OSO_3H$ | $H_2N-CH_2-C_6H_5$ |
| 39 | 2-amino-5-methylbenzenesulfonic acid | 1-(2-methylaminoethyl)-4-methyl-6-hydroxy-2-pyridone | $H_2NC_2H_4SO_2-C_2H_4OSO_3H$ | $HN(C_2H_5)_2$ |
| 40 | 2-amino-1,4-benzenedisulfonic acid | 1-(2-methylaminoethyl)-4-methyl-6-hydroxy-2-pyridone | $H_2NC_2H_4SO_2-C_2H_4Cl$ | $H_2NCH_2CO_2H$ |

Dyeing Example 3

Each of the monoazo compounds (0.3 part) obtained in Example 4 to 6 was dissolved into 200 parts of water. 20 parts of sodium sulfate and, then, 10 parts of cotton were added thereto and the temperature was elevated to 60° C. After 30 minutes had passed since the temperature reached to 60° C., 4 parts of sodium carbonate was added and dyeing was carried out at that temperature for one hour. After completion of the dyeing, the dyed cotton was washed with water and soaping was conducted to obtain a vivid yellow-colored dyed product excellent in various fastness properties and build-up property.

Dyeing Example 4

Using each of the monoazo compounds obtained in Example 4 to 6, a color paste having the following composition was prepared.

| | |
|---|---|
| Pyridone monoazo compound | 5 parts |
| Urea | 5 parts |
| Sodium alginate (5%) stock paste | 50 parts |
| Hot water | 25 parts |
| Sodium bicarbonate | 2 parts |
| Balance (water) | 13 parts |

A mercerized cotton broad cloth was printed with each color paste. After intermediate drying, steaming was conducted at 100° C. for 5 minutes. Then, the cotton cloth was washed with hot water, soaped, washed with hot water and dried to obtain a vivid yellow printed product excellent in various fastness.

What we claim is:

1. A monoazo compound represented by the following general formula (I):

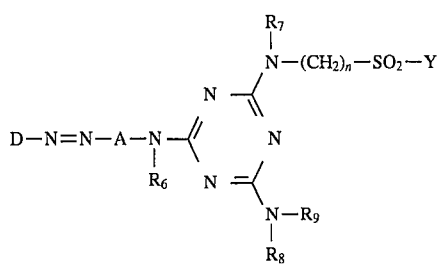

(I)

wherein D represents a phenyl or naphthyl group which may be optionally substituted;

A represents a group represented by the following formula:

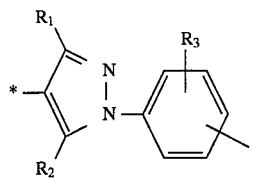

in which $R_1$ represents a methyl group, a carboxyl group or an alkoxycarboxyl group, $R_2$ represents a hydroxyl group or an amino group, $R_3$ represents a hydrogen atom, a methyl group or a sulfo group and * represents the portion connecting to the azo group;

or A represents a group represented by the following formula:

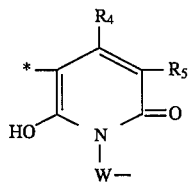

in which W represents an alkylene group, $R_4$ represents a lower alkyl group, $R_5$ represents a hydrogen atom, a halogen atom, a cyano group, a carbamoyl group, a sulfo group or a sulfoalkyl group and * represents the portion connecting to the azo group;

$R_6$ and $R_7$ are the same or different and represent a hydrogen atom or a straight chain or branched chain alkyl group which may be optionally substituted, $R_8$ and $R_9$ are the same or different and represent a hydrogen atom, a straight chain or branched chain alkyl group which may be optionally substituted, a cycloalkyl group which may be optionally substituted, an allyl group, a phenyl group which may be optionally substituted or a naphthyl group which may be optionally substituted;

n is 2, 3 or 4;

Y represents —CH=CH$_2$ or —CH$_2$CH$_2$Z in which Z represents a group removable by the action of an alkali;

provided that the substituents on D, $R_8$ and $R_9$ do not include a fiber reactive group, and at least one of the phenyl or naphthyl groups represented by D, $R_8$ or $R_9$ is substituted by a sulfo group or a carboxyl group;

or a salt thereof.

2. A monoazo compound of claim 1 wherein A is a group represented by the following formula:

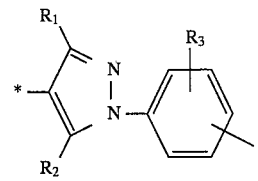

in which $R_1$ represents a methyl group, a carboxyl group or an alkoxycarbonyl group, $R_2$ represents a hydroxyl group or an amino group, $R_3$ represents a hydrogen atom, a methyl group or a sulfo group and * represents the portion connecting to the azo group.

3. A monoazo compound of claim 1 wherein A is a group represented by the following formula:

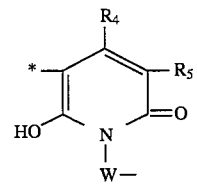

in which W represents an alkylene group, $R_4$ represents a lower alkyl group, $R_5$ represents a hydrogen atom, a halogen atom, a cyano group, a carbamoyl group, a sulfo group or a sulfoalkyl group and * represents the portion connecting to the azo group.

4. A monoazo compound of claim 1 wherein $R_8$ and $R_9$ are the same or different and represent a hydrogen atom, or an alkyl or phenyl group which may be substituted.

5. A monoazo compound of claim 4 wherein one of $R_8$ and $R_9$ is a hydrogen atom, a methyl group or an ethyl group and the other is a phenyl group which may be substituted.

6. A monoazo compound of claim 1 wherein $R_6$ and $R_7$ are the same or different and represent a hydrogen atom, a methyl group or an ethyl group.

7. A monoazo compound of claim 1 wherein n is 2 or 3.

8. A monoazo compound of claim 1 wherein Y is —CH=CH$_2$, —CH$_2$CH$_2$Cl or —CH$_2$CH$_2$OSO$_3$H.

9. A monoazo compound of claim 8 wherein Y is —CH$_2$CH$_2$OSO$_3$H.

10. A method for dyeing or printing a fiber material by applying thereto a monoazo compound of claim 1.

* * * * *